United States Patent
He et al.

(10) Patent No.: US 12,047,117 B2
(45) Date of Patent: Jul. 23, 2024

(54) OPTICAL-FIBER DEVICE FOR ONE-CORD REFERENCE OPTICAL POWER LOSS MEASUREMENT

(71) Applicant: EXFO Inc., Quebec (CA)

(72) Inventors: Gang He, Quebec (CA); Michel Leclerc, Quebec (CA)

(73) Assignee: EXFO Inc., Quebec (CA)

( * ) Notice: Subject to any disclaimer, the term of this patent is extended or adjusted under 35 U.S.C. 154(b) by 99 days.

(21) Appl. No.: 17/443,607

(22) Filed: Jul. 27, 2021

(65) Prior Publication Data

US 2022/0038177 A1    Feb. 3, 2022

Related U.S. Application Data

(60) Provisional application No. 63/058,808, filed on Jul. 30, 2020.

(51) Int. Cl.
 *H04B 10/079*    (2013.01)
 *G02B 6/42*      (2006.01)

(52) U.S. Cl.
 CPC ..... *H04B 10/07955* (2013.01); *G02B 6/4286* (2013.01)

(58) Field of Classification Search
 CPC ............ H04B 10/07955; G02B 6/3885; G02B 6/4286; G01M 11/33; G01M 11/30
 See application file for complete search history.

(56) References Cited

U.S. PATENT DOCUMENTS

| | | |
|---|---|---|
| 5,082,378 A | 1/1992 | Muller et al. |
| 5,214,730 A | 5/1993 | Nagasawa et al. |
| 5,245,684 A | 9/1993 | Terao et al. |
| 5,432,880 A | 7/1995 | Diner |

(Continued)

FOREIGN PATENT DOCUMENTS

WO    2020112704 A1    6/2020

OTHER PUBLICATIONS

Author Unknown, 'Fibre-optic communication subsystem test procedures—Part 4-5: Installed cabling plant—Attenuation measurement of MPO terminated fibre optic cabling plant using test equipment with MPO interfaces', Final draft International Standard (FDIS), Project No. IEC 61280-4-5 ED1, May 22, 2020, 75 pages, International Electrotechnical Commission, IEC SC 86C, USA.

(Continued)

*Primary Examiner* — Omar R Rojas
(74) *Attorney, Agent, or Firm* — Helene Chotard

(57) ABSTRACT

There are provided herein test instruments, devices and methods for measuring the optical power loss of optical-fiber devices under test, and particularly those terminated with multifiber connectors, which allows for a one-cord or one-cord equivalent reference method whichever the pinning of the actual optical-fiber device under test. There is proposed to add an optical-fiber expansion device to convert the pinning of the input interface of the power meter instrument from pinned to unpinned or vice-versa, while not adding extra measurement uncertainty. This is accomplished using a patch cord which core diameter is between that of the device under test and that of the input interface of the power meter instrument.

12 Claims, 13 Drawing Sheets

(56) References Cited

U.S. PATENT DOCUMENTS

| | | | |
|---|---|---|---|
| 5,825,516 A * | 10/1998 | Walsh | G01M 11/33 |
| | | | 356/73.1 |
| 6,012,852 A | 1/2000 | Kadar-Kallen et al. | |
| 6,126,519 A | 10/2000 | Minami et al. | |
| 6,416,236 B1 | 7/2002 | Childers et al. | |
| 6,540,411 B1 | 4/2003 | Cheng | |
| 6,663,296 B1 | 12/2003 | Blair et al. | |
| 6,760,516 B2 | 7/2004 | Brun et al. | |
| 6,877,909 B2 | 4/2005 | Fleenor et al. | |
| 6,899,466 B2 | 5/2005 | Manning et al. | |
| 6,981,802 B2 | 1/2006 | Sasaki et al. | |
| 8,175,431 B2 | 5/2012 | Imada et al. | |
| 8,414,200 B2 | 4/2013 | Van Noten et al. | |
| 8,692,984 B2 | 4/2014 | Schell et al. | |
| 8,876,402 B2 | 11/2014 | Hikosaka | |
| 9,366,830 B2 * | 6/2016 | Levin | G02B 6/3818 |
| 9,581,775 B2 | 2/2017 | Kondo et al. | |
| 10,050,404 B2 * | 8/2018 | Farrow | H01S 3/0675 |
| 10,200,118 B2 | 2/2019 | Ruchet | |
| 10,444,439 B2 | 10/2019 | Arao et al. | |
| 10,690,861 B2 | 6/2020 | Good et al. | |
| 11,022,520 B2 | 6/2021 | Simard et al. | |
| 2002/0081067 A1 | 6/2002 | Brun et al. | |
| 2004/0120654 A1 | 6/2004 | Kevern | |
| 2004/0179788 A1 | 9/2004 | Fleenor et al. | |
| 2004/0234204 A1 | 11/2004 | Brun et al. | |
| 2005/0180702 A1 | 8/2005 | Kevern et al. | |
| 2011/0026884 A1 | 2/2011 | Hikosaka | |
| 2013/0163930 A1 | 6/2013 | Jian | |
| 2020/0116590 A1 * | 4/2020 | Simard | G02B 6/3897 |
| 2021/0278313 A1 | 9/2021 | Simard et al. | |
| 2022/0011194 A1 * | 1/2022 | Liu | G01M 11/31 |

OTHER PUBLICATIONS

Author Unknown, 'MPOLS-84 (P) MPOLS-85 (P) MPOLP-85 (P) SmartClass™ Fiber Multifiber Light Source Multifiber Power Meter', Operating manual BN 2329/98.21, Apr. 2020, 116 pages, Viavi Solution Inc.

James D. Kevern et al., Multifiber Ferrule Kevern et al., Statutory Invention Registration, US H2141 H, Jan. 3, 2006, 7 pages, USA.

* cited by examiner

One-cord reference (as per IEC 61280-4-5):

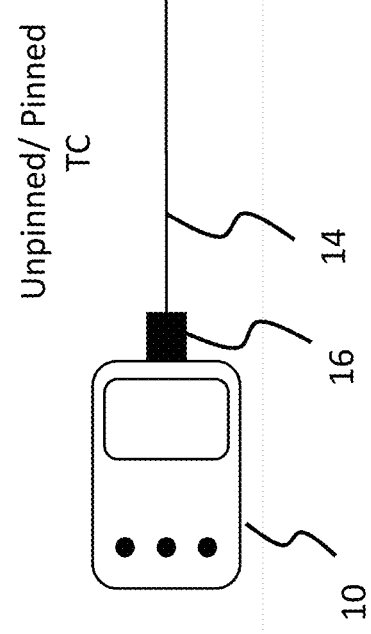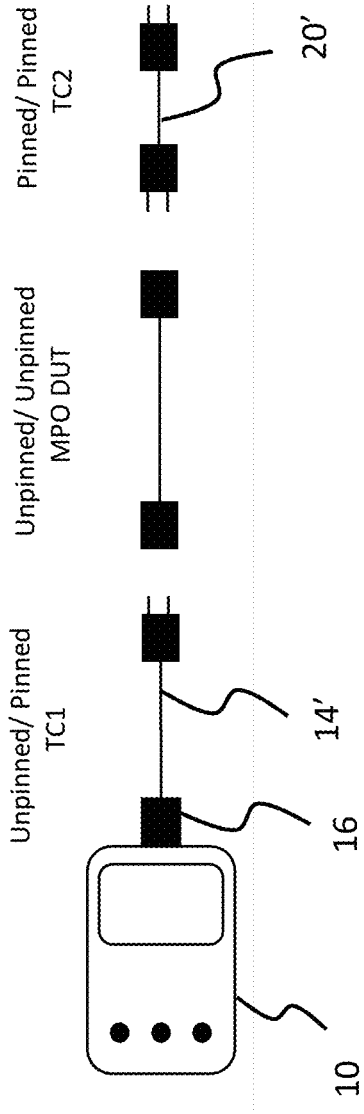
Fig. 3A
Fig. 3B

OPTICAL-FIBER DEVICE FOR ONE-CORD REFERENCE OPTICAL POWER LOSS MEASUREMENT

TECHNICAL FIELD

The present description generally relates to optical power loss measurement, and more particularly to test instruments, devices and methods for measuring the optical power loss of optical-fiber links or devices under test, and particularly those terminated with multifiber connectors.

BACKGROUND

Optical power loss measurements are crucial for proper management of network communication systems. To this end, the International Electrotechnical Commission (IEC) established standard method and procedures for measuring the optical power loss of optical-fiber devices under test that are terminated with multifiber connectors, using a light source and a power meter (referred to as the Light Source Power Meter (LSPM) approach). The IEC 61280-4-5 Standard describes different test methods for attenuation or loss measurement of optical-fiber cabling terminated with multifiber connectors, using test instruments with multifiber connector interfaces. It describes multiple light-source power-meter (LSPM) testing methods and procedures associated with a multitude of scenarios that are expected to occur in the field, including different methods for referencing the optical loss test instruments depending on the actual scenario.

The one-cord reference method described therein (see IEC 61280-4-5 Annex A) is the preferred LSPM test method in the industry because it minimizes the loss measurement uncertainty while including the insertion losses associated with both end connectors of the Device (or link) Under Test (DUT). The one-cord reference procedure requires that the power meter instrument employs a large-area detector, or a large-core fiber can be used to guide all light from the input interface of the power meter instrument, to the power detector within the power meter instrument (for example, in multifiber testing, the power meter instrument may comprise a plurality of fiber-pigtailed power detectors that are connected to a multifiber connector input interface).

Referring to FIG. 1, the multifiber connectors terminating the optical-fiber devices under test may either be pinned or unpinned. The problem is that the input interface of a given power meter instrument is either pinned or unpinned. If the interface is pinned, the one-cord reference method is only possible if the DUT also has a pinned interface (see IEC 61280-4-5 Annex A). If the DUT and power meter instruments have incompatible connectors, the IEC 61280-4-5 Standard further provides an adapter-cord reference method which somehow converts the input interface of the power meter instrument from pinned to unpinned or vice-versa. However, the adaptor cord is known to introduce a small bias, and therefore additional uncertainty, in the insertion loss measurement (see IEC 61280-4-5 Annex C).

Another concern related to optical power loss measurement is that the multifiber connectors terminating the optical-fiber device under test may be either angle-polished (APC) or non-angle polished (UPC). The test instruments would ideally be able to apply the one-cord reference method to either one. Yet another concern is that the input interface of the test instrument is susceptible to wearing out after multiple connections. To this end, U.S. Pat. No. 9,366,830 to Levin describes a UPC/APC hybrid and contactless input interface. However, this interface does not address the above-described issue of the non-applicability of the one-cord reference method for both pinned and unpinned DUTs for a given power meter test instrument.

There therefore remains a need for test instruments, devices and methods for measuring the optical power loss of optical-fiber devices under test, and particularly those terminated with multifiber connectors, which allows for a one-cord or one-cord equivalent reference method whichever the pinning of the actual optical-fiber device under test.

SUMMARY

There are provided herein test instruments, devices and methods for measuring the optical power loss of optical-fiber devices under test, and particularly those terminated with multifiber connectors, which allows for a one-cord or one-cord equivalent reference method whichever the pinning of the actual optical-fiber device under test.

There is herein proposed to add an optical-fiber expansion device to convert the pinning of the input interface of the power meter instrument from pinned to unpinned or vice-versa, while not adding extra measurement uncertainty. This is accomplished using a patch cord which core diameter is between that of the device under test and that of the input interface of the power meter instrument.

Throughout this specification, reference is made to the optical-fiber device under test (DUT). The optical-fiber device under test that is terminated with multifiber connectors may comprise single-mode or multimode optical-fiber link(s) and may further comprise connectors, adapters, splices, and other passive devices. The multifiber connectors terminating the optical-fiber devices under test may be angle-polished (APC) or non-angle polished (UPC) connectors; and they may be pinned or unpinned. A test instrument for measuring the optical loss would ideally be able to universally apply the one-cord or a one-cord equivalent reference method to any of such optical-fiber device under test.

For more universality, the optical-fiber expansion device may be terminated with a UPC/APC hybrid input interface. The UPC/APC hybrid input interface may either be made contactless or non-contactless depending on the application, a contactless interface offering the optional benefit of being less susceptible to wearing out after multiple connections.

Optionally, the optical-fiber expansion device may optionally be integrated in removeable connector cartridge such as that described in U.S. Pat. No. 11,022,520 (hereby incorporated by reference). To this end, the power meter instrument may be provided with two interchangeable cartridges, i.e., one having a pinned interface towards the DUT and the other having an unpinned interface. Such solution allows to select the proper click-out connector depending on the DUT to be tested in addition to make it replaceable once the input interface is worn out from multiple connections, thereby relaxing the need for a contactless connector.

In accordance with one aspect, there is provided an optical-fiber expansion device, for use in combination with a power meter instrument and an optical source instrument for measuring the optical power loss of an optical-fiber device under test (DUT). The optical-fiber expansion device comprises:

a first connector interface for connection to the power meter instrument, the first connector interface having a pinning arrangement that is complementary to a pinning arrangement of the input connector interface of the power meter instrument;

a second connector interface for connection towards the DUT, the second connector interface having a pinning arrangement that is also complementary to the pinning arrangement of the input connector interface of the power meter instrument; and at least one optical fiber extending between the first connector interface and the second connector interface, wherein the optical fiber has core diameter that is between a core diameter of the optical-fiber of the DUT and a core diameter of the optical-fiber of the input interface of the power meter instrument and the optical fiber has numerical aperture that is between a numerical aperture of the optical-fiber of the DUT and a numerical aperture of the optical-fiber of the input interface of the power meter instrument.

In accordance with another aspect, there is provided a power meter test arrangement, for use in combination with an optical source instrument for measuring the optical power loss of an optical-fiber device under test (DUT). The power meter instrument comprises:

a power meter instrument comprising:
   an input connector interface for connection towards the DUT for optical power measurement; and
   at least one fiber-pigtailed power detector connected to the input connector interface; and an optical-fiber expansion device comprising:
   a first connector interface for connection to the input connector interface of the power meter instrument, the first connector interface having a pinning arrangement that is complementary to a pinning arrangement of the input interface of the power meter instrument;
   a second connector interface for connection towards the DUT, the second connector interface having a pinning arrangement that is also complementary to the pinning arrangement of the input interface of the power meter instrument; and
   at least one optical fiber extending between the first connector interface and the second connector interface, wherein the optical fiber has core diameter that is between that of the DUT and that of the input interface of the power meter instrument and the optical fiber has numerical aperture that is between a numerical aperture of the optical-fiber of the DUT and a numerical aperture of the optical-fiber of the input interface of the power meter instrument.

In accordance with another aspect, there is provided an insertion loss test set for measuring the optical power loss of an optical-fiber device under test (DUT). The insertion loss test set comprises:

an optical source instrument comprising:
   an output connector interface for connection towards the DUT for optical power measurement; and
   at least one fiber-pigtailed light source connected to the output connector interface;

a power meter instrument comprising:
   an input connector interface for connection towards the DUT for optical power measurement; and
   at least one fiber-pigtailed power detector connected to the input connector interface; and the optical-fiber expansion device as described above.

In some embodiments, the second connector interface may comprise a hybrid connector interface configured for connection to either angle-polished (APC) or non-angle-polished (UPC) connectors.

In this specification, unless otherwise mentioned, word modifiers such as "substantially" and "about" which modify a value, condition, relationship or characteristic of a feature or features of an embodiment, should be understood to mean that the value, condition, relationship or characteristic is defined to within tolerances that are acceptable for proper operation of this embodiment in the context its intended application.

Further features and advantages of the present invention will become apparent to those of ordinary skill in the art upon reading of the following description, taken in conjunction with the appended drawings.

BRIEF DESCRIPTION OF THE DRAWINGS

FIG. 1 (prior art) comprises FIG. 1A and FIG. 1B wherein

FIG. 2 (prior art) comprises FIG. 2A and FIG. 2B wherein FIG. 2A is a schematic illustrating a referencing step of the one-cord reference method as described in IEC 61280-4-5 Annex A; and wherein

FIG. 3 comprises FIG. 3A and FIG. 3B wherein FIG. 3A is a schematic illustrating a referencing step of the one-cord-equivalent reference method in accordance with one embodiment employing an optical-fiber expansion device; and wherein FIG. 3B is a schematic illustrating the measurement step.

FIG. 5 comprises FIGS. 5A, 5B and 5C wherein

FIG. 8 comprises FIGS. 8A and 8B wherein

Figure 1B:
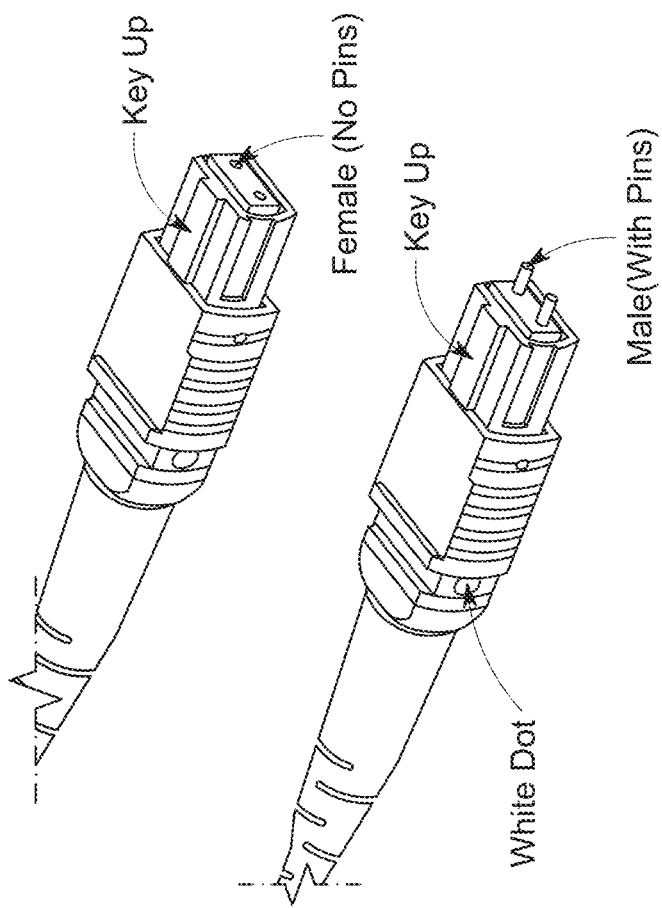
FIG. 1A is a schematic illustrating a multifiber connector endface and FIG. 1B is a picture showing unpinned and pinned multifiber connectors.
Figure 1A:
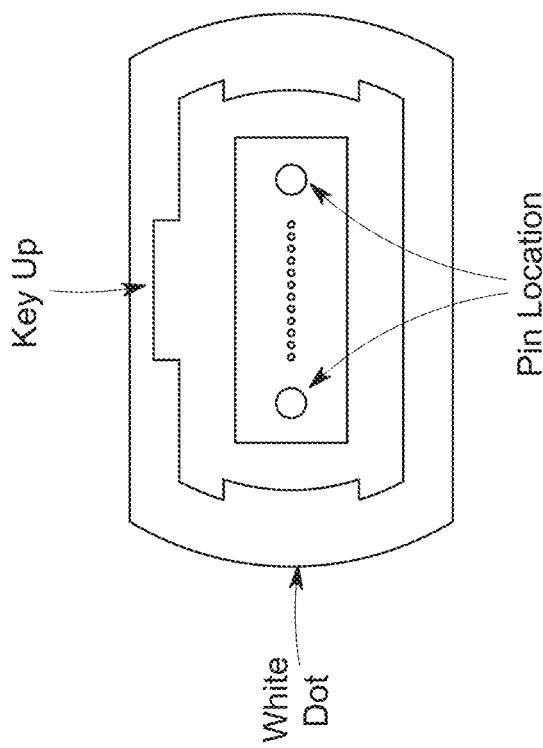

It will be noted that throughout the drawings, like features are identified by like reference numerals. In the following description, similar features in the drawings have been given similar reference numerals and, to not unduly encumber the figures, some elements may not be indicated on some figures if they were already identified in a preceding figure. It should be understood herein that elements of the drawings are not necessarily depicted to scale, since emphasis is placed upon clearly illustrating the elements and structures of the present embodiments. Some mechanical or other physical components may also be omitted in order to not encumber the figures.

The following description is provided to gain a comprehensive understanding of the methods, apparatus and/or systems described herein. Various changes, modifications, and equivalents of the methods, apparatuses and/or systems described herein will suggest themselves to those of ordinary skill in the art. Description of well-known functions and structures may be omitted to enhance clarity and conciseness.

Although some features may be described with respect to individual exemplary embodiments, aspects need not be limited thereto such that features from one or more exemplary embodiments may be combinable with other features from one or more exemplary embodiments.

DETAILED DESCRIPTION

There are provided herein test instruments, devices and methods for use in characterizing optical fiber links or other optical-fiber devices, and more specifically for determining an optical power loss of a Device Under Test (DUT) using referenced light source and power meter test instruments part of an insertion loss test set.

Figure 2A:
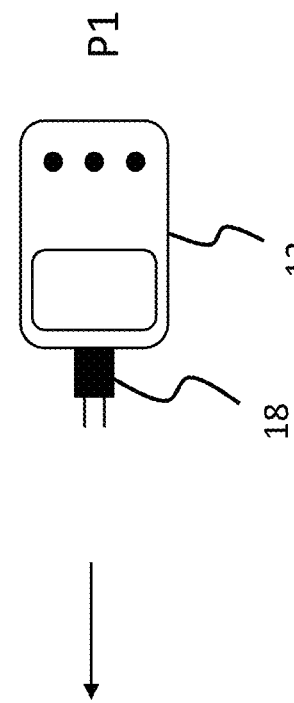
Figure 2A:
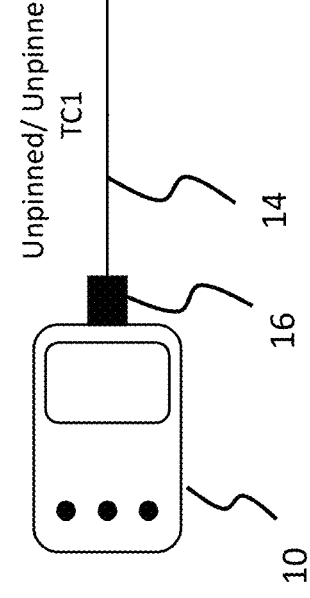
Figure 2B:
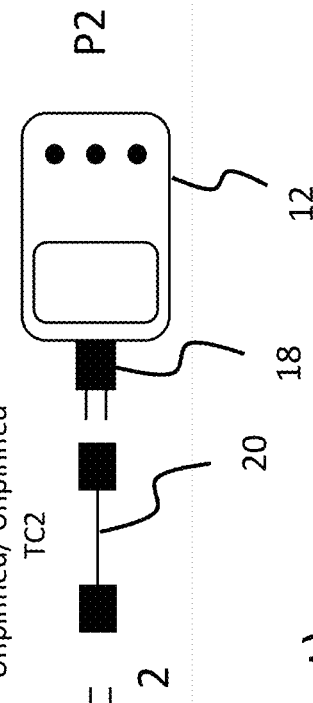
FIG. 2B is a schematic illustrating the measurement step.
Figure 2B:
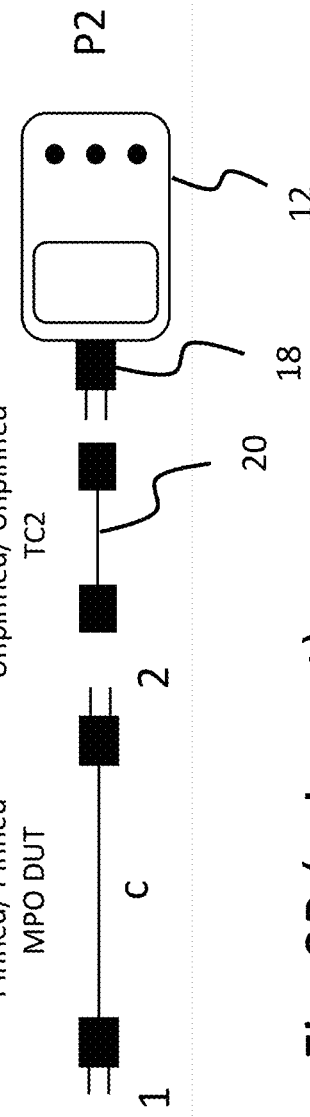
Figure 2B:
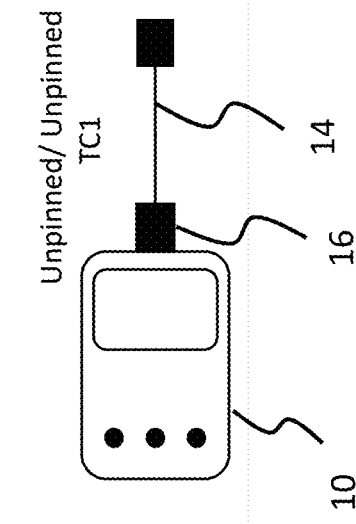

FIGS. 2A and 2B illustrates an insertion loss measurement method using the one-cord reference method as described in IEC 61280-4-5 Annex A and which is compatible with both single-mode and multimode DUTs. The method employs an insertion loss test set 100 comprising an optical source instrument 10 and a power meter instrument 12, as well as a first test cord 14. In this specific case, the optical source instrument 10 and the power meter instrument 12 each have a pinned connector interface 16, 18. The first test cord 14 is therefore unpinned on both sides. FIG. 2A illustrates the referencing step of the test set 100 which comprises measuring, using a power detection (not shown) of the power meter instrument 12, a first power value P1 of test light emitted by a light source (not shown) of the optical source instrument 10 and outputted from the first test cord 14. In FIGS. 2A and 2B (as well as FIGS. 3A and 3B), for the purpose of illustrating the pinning of the connector interfaces, some components are illustrated as not being mutually connected. It will even though be understood that for performing measurements, the various connector interfaces need to be interconnected.

FIG. 2B illustrates the measurement step of the test set 100 which comprises measuring, using a power detection (not shown) of the power meter instrument 12, a second power value P2 of test light emitted by a light source (not shown) of the optical source instrument 10 and outputted from a test link comprising the first test cord 14, the DUT and a second test cord 20 connected in series.

Accordingly, the insertion loss value IL can be evaluated in decibels by performing:

$$IL = 10\ \log_{10}(P1/P2)\ (dB) \quad (1)$$

As exposed in IEC 61280-4-5 Annex A, by using the one-cord reference method, the measured insertion loss value includes the insertion loss $IL_C$ of the DUT, the insertion of the connector loss $IL_1$ of the input connector of the DUT and the connector loss $IL_2$ of the output connector of the DUT:

$$IL = IL_1 + IL_2 + IL_C \quad (2)$$

Throughout this document, power values and power ratios are expressed in dBm and dB, respectively. However, one skilled in the art will understand that the insertion loss values can equivalently be expressed on a linear scale.

The power meter instrument 12 has a static pinned interface. If the interface is pinned, the one-cord reference method is only possible for a DUT also having a pinned interface (see IEC 61280-4-5 Annex A). If the DUT has incompatible connectors, the IEC 61280-4-5 Standard further provides an adapter-cord reference method which somehow converts the input interface of the power meter instrument from pinned to unpinned or vice-versa. However, the adaptor cord is known to introduce a small bias in the insertion loss measurement (see IEC 61280-4-5 Annex C).

FIGS. 3A and 3B illustrate an insertion loss measurement method using a different one-cord-equivalent reference method, in accordance with one embodiment. The method illustrated in FIGS. 3A and 3B allows for measuring the insertion loss of the DUT that has unpinned connector interfaces on both sides, using pinned optical source and power meter instruments. The method uses an optical-fiber expansion device 22 to convert the pinning of the input interface 18 of the power meter instrument 12 from pinned to unpinned, while not adding any extra measurement uncertainty. This method is also compatible with both single-mode and multimode DUTs.

Again, in this case, the optical source instrument 10 and the power meter instrument 12 each have a pinned connector interface 16, 18. But here, for compatibility with an unpinned DUT, the first test cord 14' has an unpinned interface on one side and a pinned interface on the other side. And the test set 100 further comprises an optical-fiber expansion device 22 to convert the pinning of the input interface 18 of the power meter instrument 12 from pinned to unpinned. FIG. 3A illustrates the referencing step of the test set 100 which comprises measuring, using a power detection (not shown) of the power meter instrument 12, a first power value P1 of test light emitted by a light source (not shown) of the optical source instrument 10 and outputted from the first test cord 14'.

FIG. 3B illustrates the measurement step of the test set 100 which comprises measuring, using a power detection (not shown) of the power meter instrument 12, a second power value P2 of test light emitted by a light source (not shown) of the optical source instrument 10 and outputted from a test link comprising the first test cord 14', the DUT, a second test cord 20' (pinned/pinned) and the optical-fiber expansion device 22 connected in series.

Figure 4:
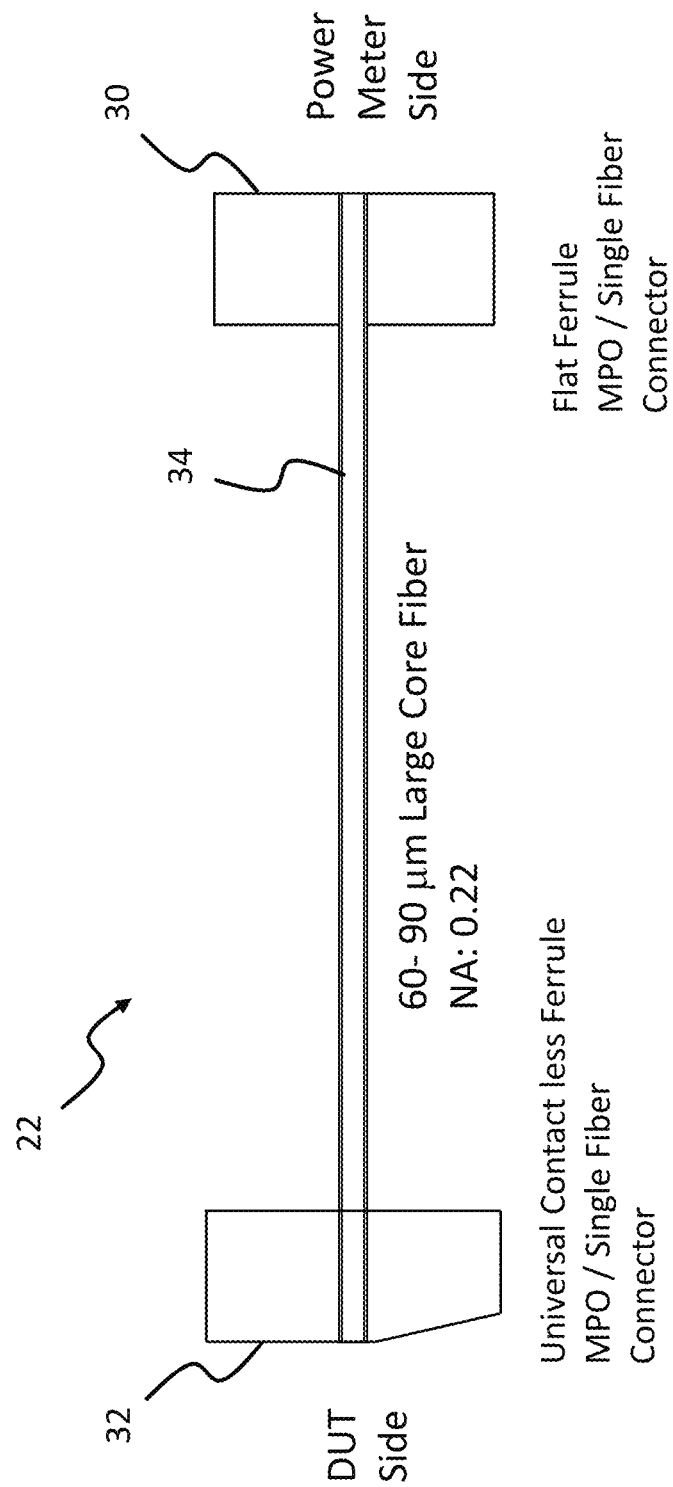
FIG. 4 is a schematic illustrating an optical-fiber expansion device in accordance with one embodiment employing an UPC/APC hybrid connector interface.

Referring to FIG. 4 which illustrates the optical-fiber expansion device 22 in more details, the expansion device 22 allows for an insertion loss measurement that does not add extra measurement uncertainty because the expansion device 22 comprises an optical fiber having core diameter that is between that of the DUT and that of the input interface of the power meter instrument. For that reason, the connection loss between the second test cord 20' and the expansion device 22, as well as that between the expansion device 22 and the power meter instrument 12 are negligible. The insertion loss associated with the optical fiber link within the expansion device 22 can also be made negligible by using a short enough fiber link.

Accordingly, as in FIGS. 2A and 2B, using the setup of FIGS. 3A and 3B, the insertion loss value IL can be evaluated in decibels by performing:

$$IL = 10\ \log_{10}(P1/P2)\ (dB) \quad (3)$$

Furthermore, because of the negligible insertion loss associated with the expansion device 22, the measured insertion loss value is the same as that obtained with a one-cord reference method, i.e.:

$$IL = IL_1 + IL_2 + IL_C \quad (4)$$

Thus the "one-cord equivalent" appellation.

Referring back to FIG. 4, the expansion device 22 allows for an insertion loss measurement with both pinned and unpinned interfaced DUTs, irrespective of the pinning configuration of the test instruments 10, 12.

The expansion device 22 comprises a first connector interface 30 for connection to the power meter instrument 12. The first connector interface 30 has a pinning arrangement that is complementary to a pinning arrangement of the input connector interface 18 of the power meter instrument 12, i.e., unpinned in this case.

The expansion device 22 comprises a second connector interface 32 for connection towards the DUT. The second connector interface 32 has a pinning arrangement that is also complementary to the pinning arrangement of the input connector interface 18 of the power meter instrument 12.

More particularly, in the embodiment of FIG. 4, input connector interface 18 of the power meter instrument 12 is pinned. The first connector interface 30 and the second connector interface 32 are both unpinned.

The expansion device 22 further comprises at least one optical fiber 34 extending between the first connector interface 30 and the second connector interface 32. Although not shown in FIG. 4, it will be understood that the expansion device 22 may be made as a multifiber device. In this case, both first connector interface 30 and second connector interface 32 are multifiber connectors such as MPO connectors, linked by a multifiber cable which provides the at least one optical fiber 34.

The optical-fiber(s) 34 has core diameter that is between a core diameter of the optical-fiber of the DUT and a core diameter of the optical-fiber of the input interface 18 of the power meter instrument 12. More particularly, in the embodiment of FIG. 4, the expansion device 22 is designed with step index multimode fiber (SI-MMF) but a gradient index fiber may be used as well. In order to be compatible with single-mode and multimode DUTs, the core diameter may be selected to be between about 60 and 90 µm, whereas the Numerical Aperture (NA) may be between about 0.2 and 0.22. This specific design allows for a negligible connection loss both to the DUT and to power meter instrument 12.

However, it is noted that in other embodiments, if the DUTs are restricted to single-mode fibers only, the optical fiber 34 of the expansion device 22 may be selected with a smaller core diameter such as a 50 µm multimode fiber.

Furthermore, in the embodiment of FIG. 4, the second connector interface 32 is a UPC/APC hybrid input interface for compatibility with both angle-polished and non-angle-polished DUTs. The second connector interface 32 therefore comprises a hybrid ferrule. In the case of FIG. 4, the UPC/APC hybrid input interface is not fully contactless.

The first connector interface 30 may be made angle-polished, non-angle-polished or hybrid, as long as it is compatible with the input interface 18 of the power meter instrument 12. In one embodiment, the input interface 18 of the power meter instrument 12 is also made UPC/APC hybrid. Therefore, in the embodiment of FIG. 4, the first connector interface 30 is simply made non-angle-polished.

Figure 5A:
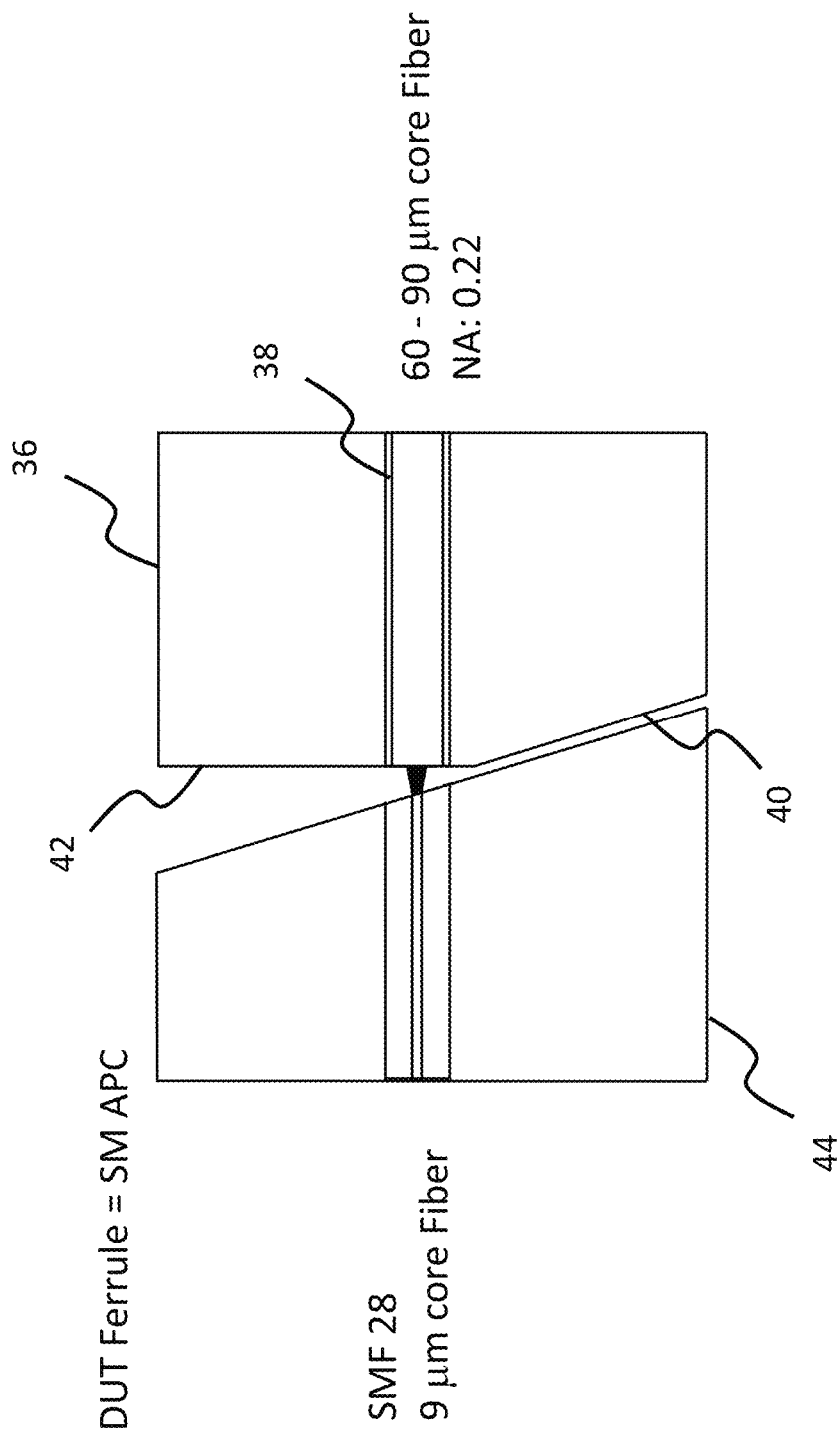
FIG. 5A is a schematic illustrating a compatibility of the expansion device of FIG. 4 with a DUT having a single-mode SMF-28 APC connector interface.
Figure 5B:
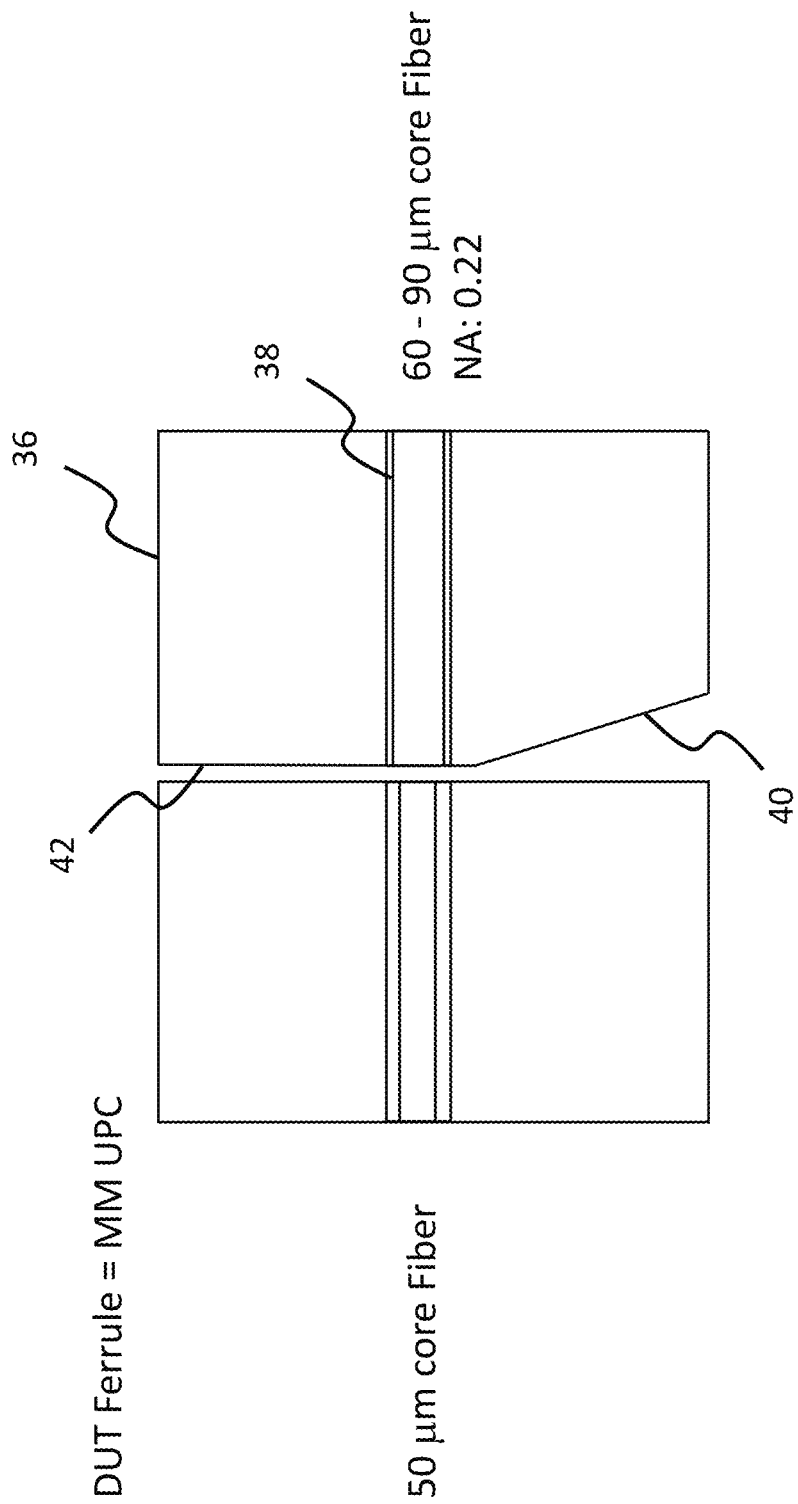
FIG. 5B is a schematic illustrating a compatibility of the expansion device of FIG. 4 with a DUT having a multimode UPC connector interface.
Figure 5C:
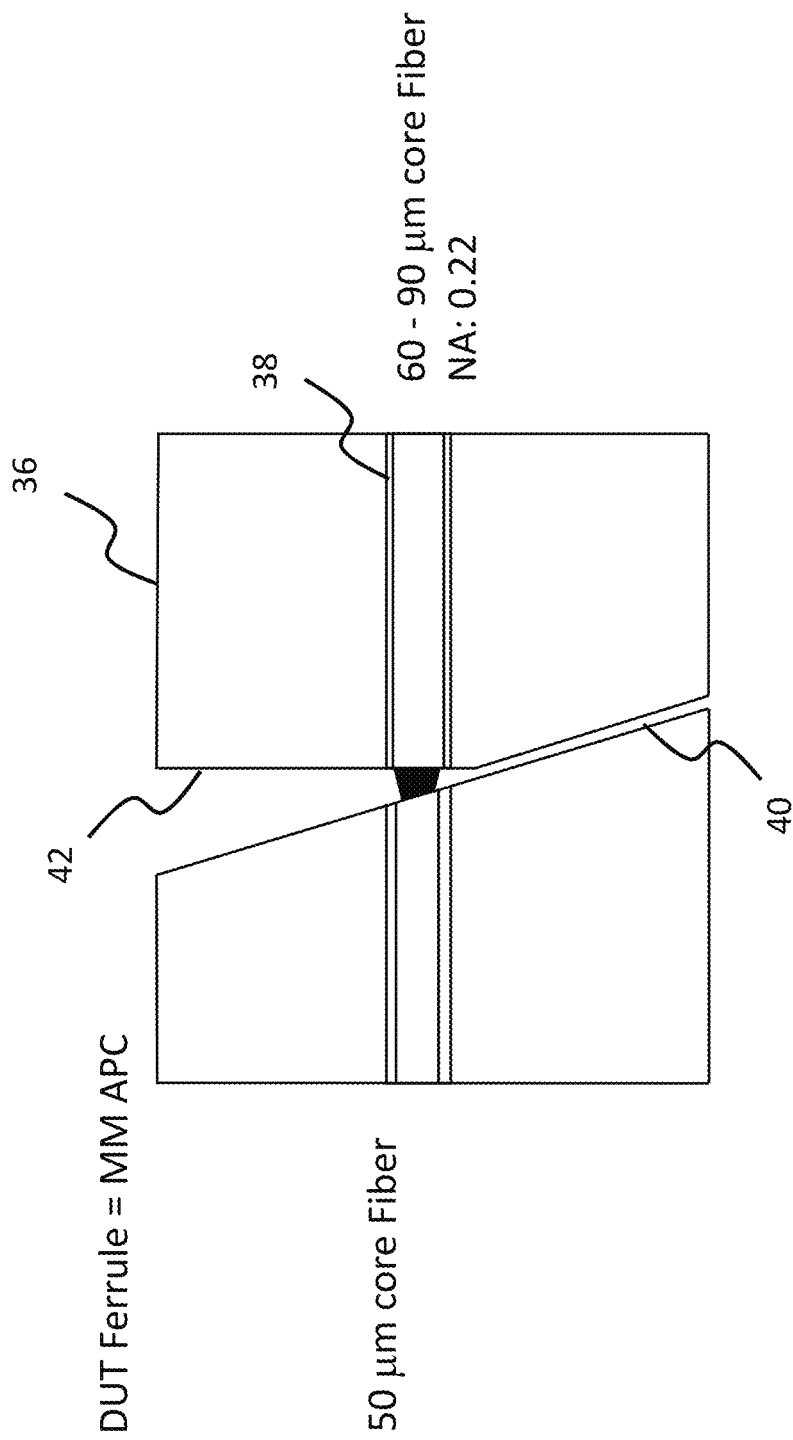
FIG. 5C is a schematic illustrating a compatibility of the expansion device of FIG. 4 with a DUT having a multimode APC connector interface.

FIGS. 5A, 5B and 5C illustrate the second connector 32 of the expansion device 22 of FIG. 4 in more details. FIG. 5A illustrates a compatibility of the expansion device 22 of FIG. 4 with a DUT having a single-mode SMF-28 APC connector interface. FIG. 5B illustrates a compatibility of the expansion device 22 of FIG. 4 with a DUT having a multimode UPC connector interface. FIG. 5C illustrates a compatibility of the expansion device 22 of FIG. 4 with a DUT having a multimode APC connector interface.

The second connector interface 32 is made UPC/APC hybrid using a hybrid ferrule 36 comprising a first connection surface 40 and a second connection surface 42. As illustrated, an end 38 of the optical fiber 34 is embedded in the ferrule 36. The first connection surface 40 is polished at angle relative to a longitudinal axis of the optical fiber 38 and the second connection surface 42 is polished substantially perpendicular to the longitudinal axis of the optical fiber 38. The optical-fiber core of the optical fiber 38 opens on the second surface 42. The first and the second surfaces 40, 42 together form a convex ferrule surface for connection to the DUT interface.

As illustrated, the optical-fiber core is on the second surface 42 (such that the core completely lies on the second surface 42) and the second connector interface 32 of FIGS. 5A, 5B and 5C is optimized to minimize a distance between the ferrule 36 and the ferrule 44 of the DUT connector interface on the optical fiber core area when DUT connector interface is APC, while making it compatible for both single-fiber or multifiber APC. The second connector interface 32 is contactless (over the optical fiber core area) in the case of an APC DUT connector interface and is still compatible with UPC DUT connector interfaces although not contactless in this case (see FIG. 5B). In that case, the physical contact between optical fibers can be limited via the use of an anti-reflection coating and a recessed connector such as in MNC™ technology.

Figure 6:
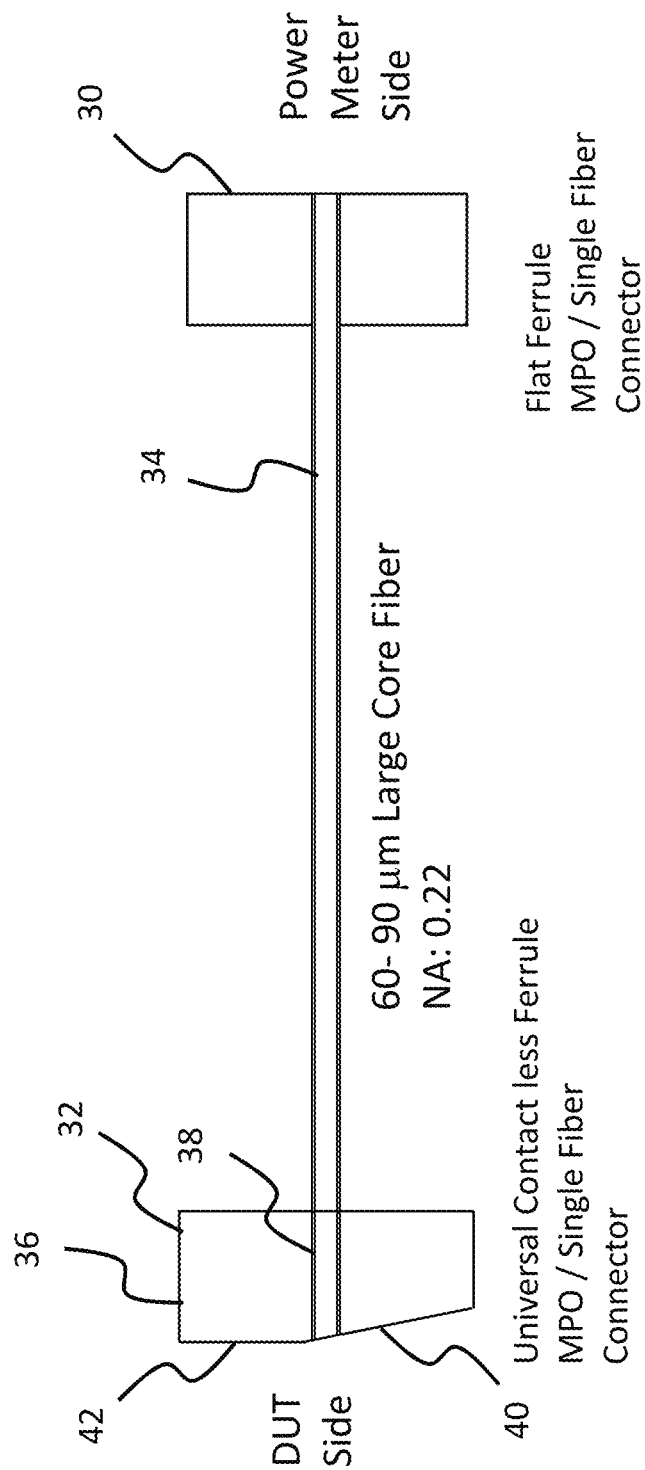
FIG. 6 is a schematic illustrating an optical-fiber expansion device in accordance with another embodiment employing a different UPC/APC hybrid input interface.

FIG. 6 illustrates an expansion device 22 in accordance with another embodiment. The embodiment of FIG. 6 is mostly similar to that of FIG. 4 and like features will not be repeatedly described. The second connector interface 32 of the embodiment of FIG. 6 is also made UPC/APC hybrid using a hybrid ferrule 36 comprising a first connection surface 40 and a second connection surface 42. The difference is that in FIG. 6, the optical-fiber core of the optical fiber 38 opens on the first surface 40 (such that the core completely lies on the first surface 40). In this case, the second connector interface 32 is contactless (over the optical fiber core area) in the case of a UPC DUT connector interface, while remaining compatible with APC DUT connector interfaces although not contactless in this case.

Figure 7:
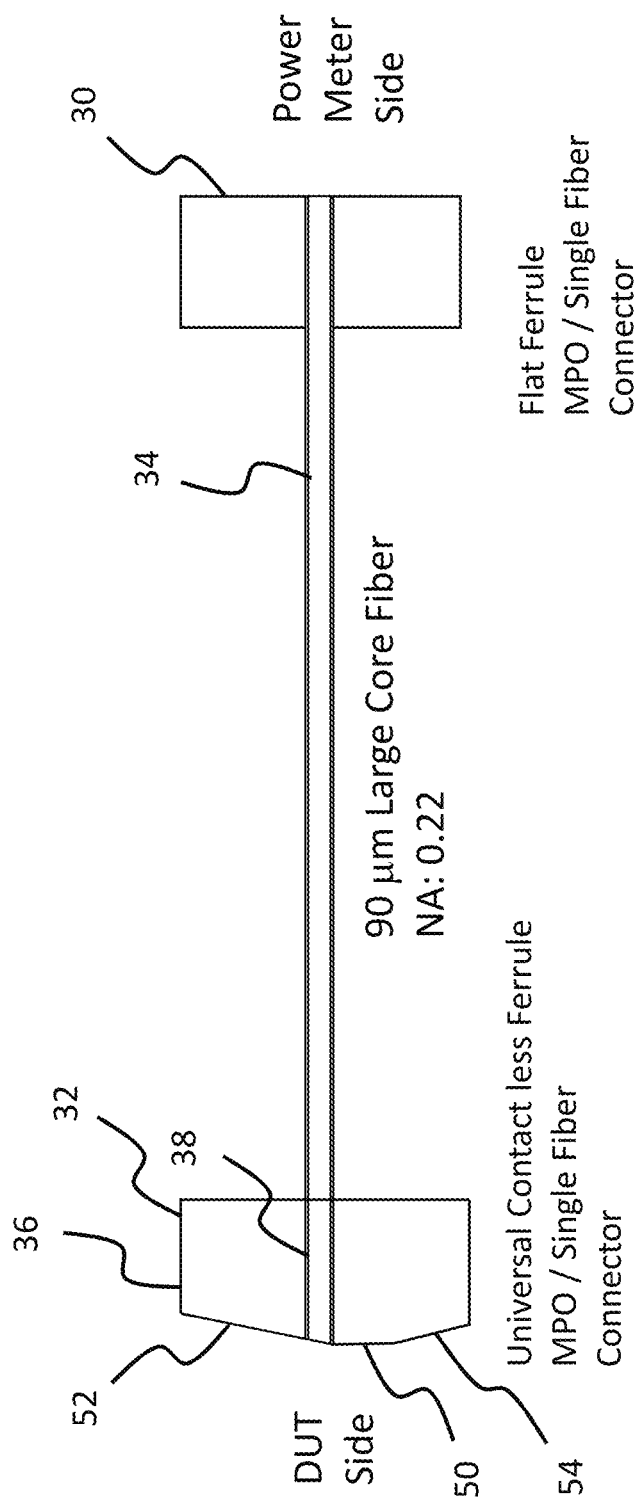
FIG. 7 is a schematic illustrating an optical-fiber expansion device in accordance with another embodiment employing a contactless UPC/APC hybrid connector interface.

FIG. 7 illustrates an expansion device 22 in accordance with yet another embodiment. Again, the embodiment of FIG. 7 is mostly similar to that of FIG. 4 and like features will not be repeatedly described. The second connector interface 32 is also made UPC/APC hybrid using a hybrid ferrule 36. However, in this case, the second connector interface 32 is made contactless to both APC and UPC connectors. The hybrid ferrule 36 comprises a first surface 50, second surface 52 and a third surface 54. The first surface 50 is polished at angle relative to a longitudinal axis of the optical fiber 38, the second surface 52 is polished substantially perpendicular to the longitudinal axis of the optical fiber 38 and the third surface 54 is also polished at angle relative to a longitudinal axis of the optical fiber 38, such that the first, the second and the third surfaces 50, 52, 54 together form a convex ferrule surface for connection to the DUT. The optical-fiber core of the optical fiber 38 opens on the third surface 54 (such that the core completely lies on the third surface 54).

Figure 8A:
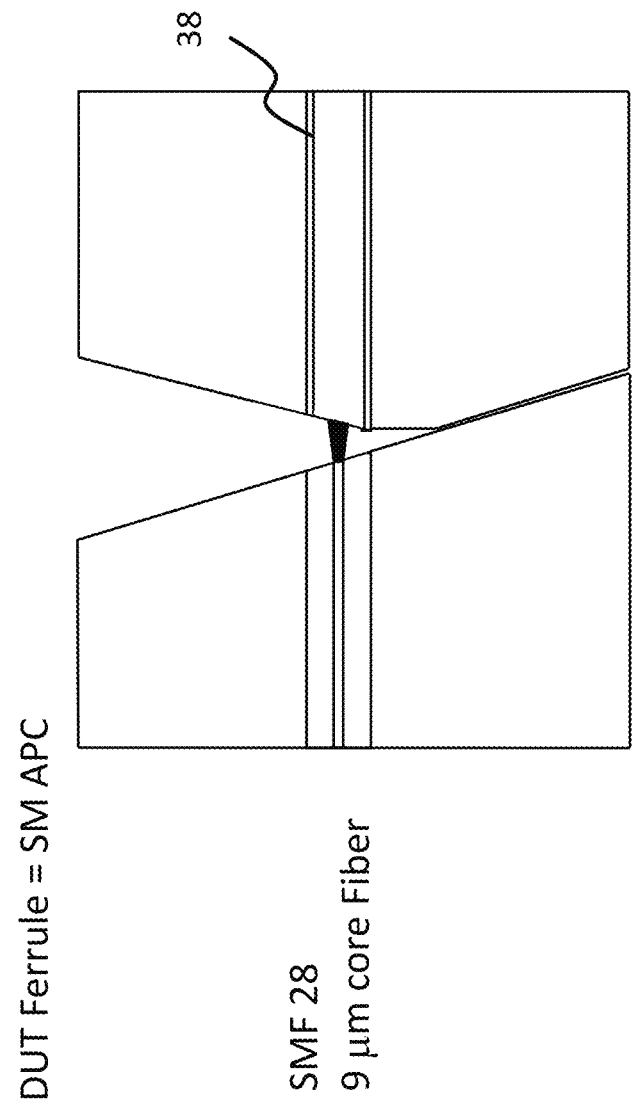
FIG. 8A is a schematic illustrating a compatibility of the expansion device of FIG. 7 with a DUT having a single-mode SMF-28 APC connector interface.
Figure 8B:
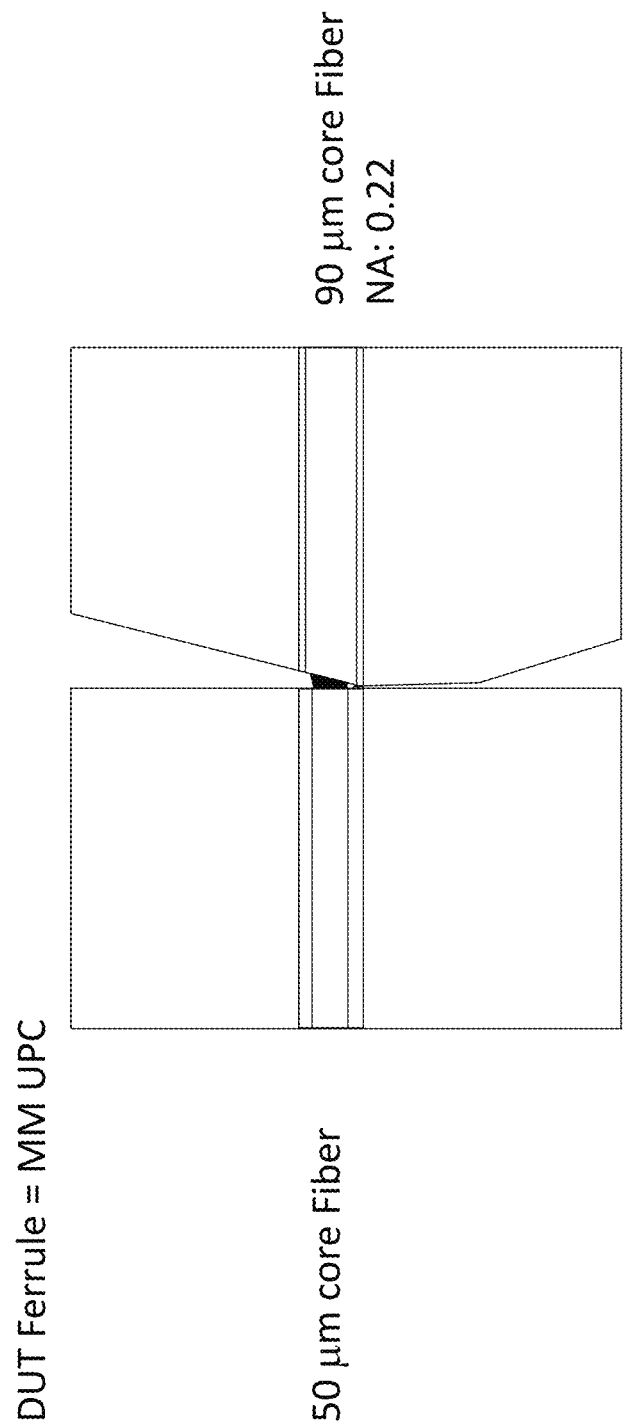
FIG. 8B is a schematic illustrating a compatibility of the expansion device of FIG. 7 with a DUT having a multimode UPC connector interface.

FIG. 8A illustrates a compatibility of the expansion device 22 of FIG. 7 with a DUT having a single-mode SMF-28 APC connector interface. The angles and the dimensions of the surfaces are designed to ensure that the core of the optical fiber 38 captures all the light from the SMF-28 fiber core while still avoiding physical contact of the ferrules within the optical fiber core area. FIG. 8B illustrates a compatibility of the expansion device 22 of FIG. 7 with a DUT having multimode UPC connector interface. The angles and the dimensions of the surfaces are also designed to ensure that the core of the optical fiber 38 captures all the light from the multimode 50-μm fiber core while still avoiding physical contact of the ferrules within the optical fiber core area.

Figure 9:
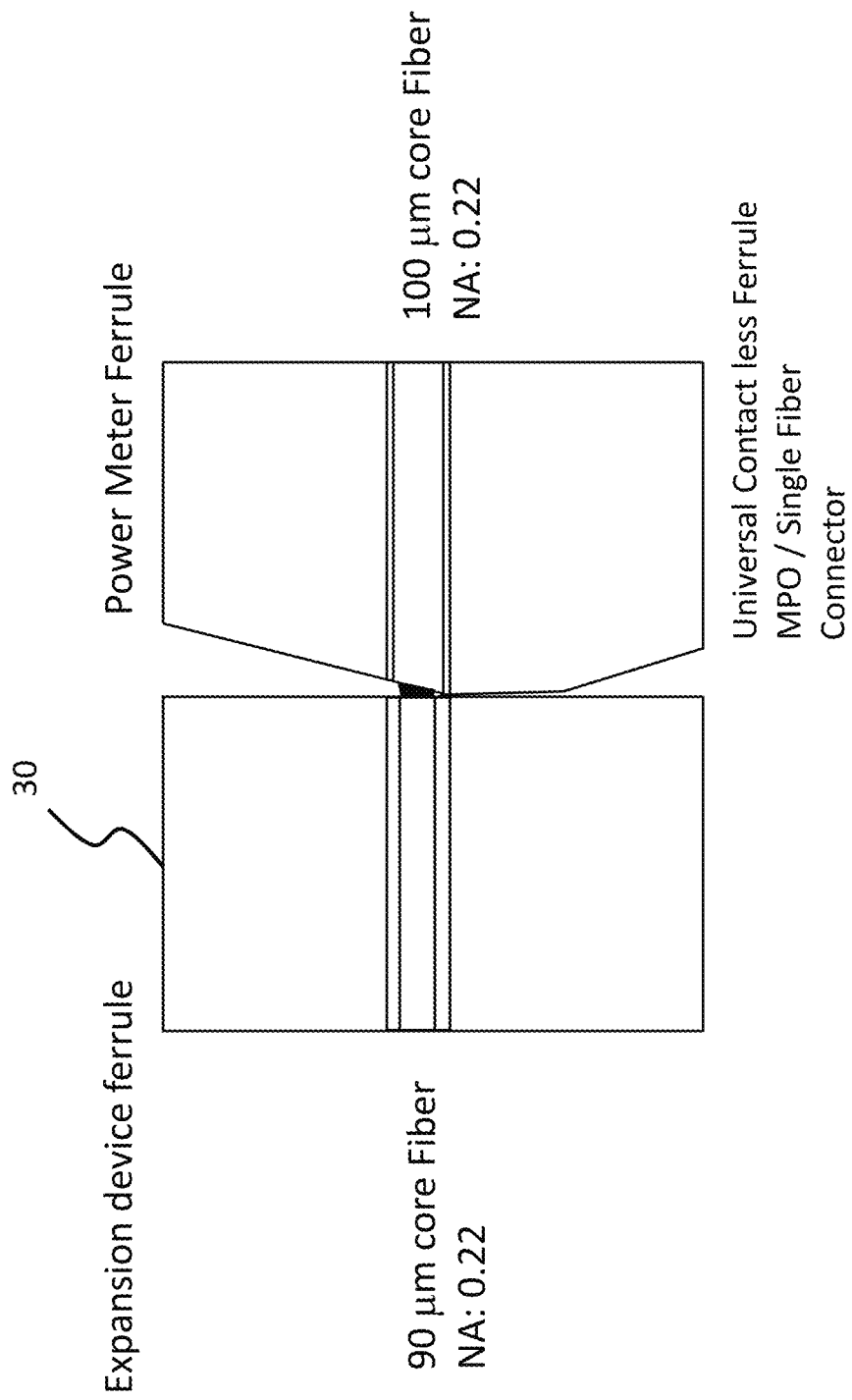
FIG. 9 is a schematic illustrating a compatibility of the expansion device of FIG. 4, 6 or 7 with a power meter instrument having a UPC/APC hybrid input interface.

In one embodiment, the input connection interface 18 of the power meter instrument 12 also uses a UPC/APC hybrid ferrule similar to that of the second connector interface 32 of the expansion device 22 of FIG. 7. However, the ferrules differ in that the core diameter of the optical fiber in the input connection interface 18 is larger (in this case 100 μm) than that of the expansion device 22. FIG. 9 illustrates a compatibility of the expansion device 22 of FIG. 4, 6 or 7 with such a power meter instrument 12.

Figure 10:
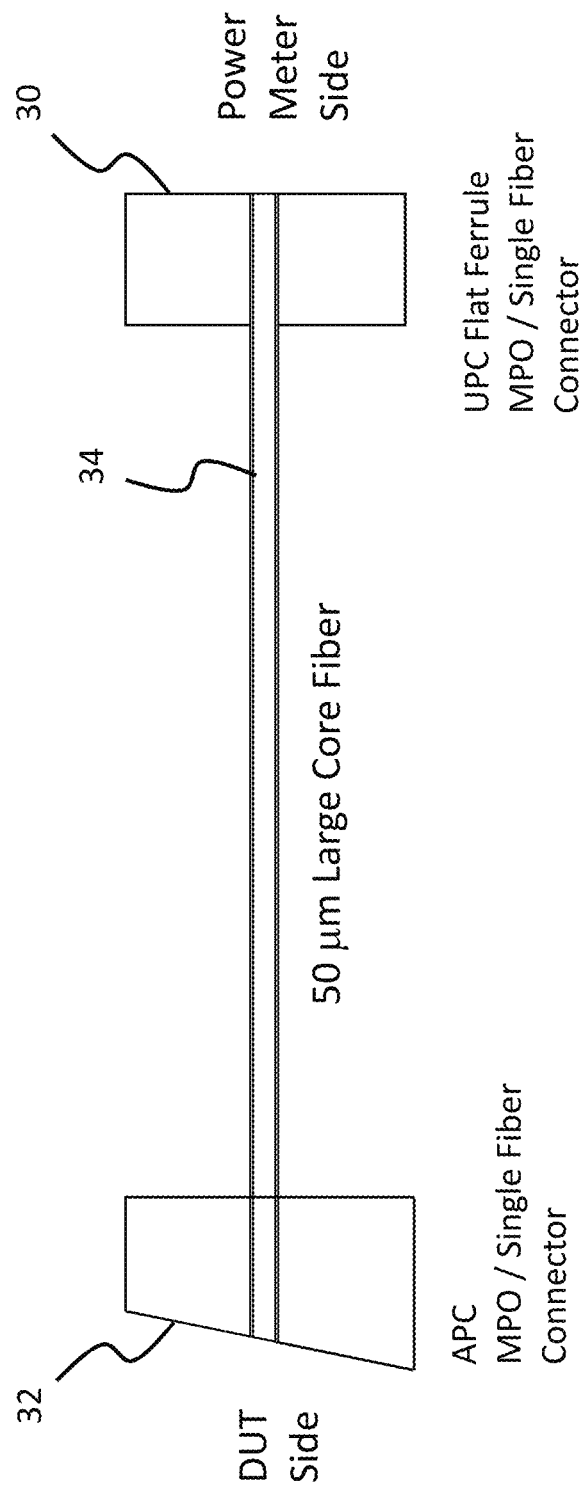
FIG. 10 is a schematic illustrating an optical-fiber expansion device in accordance with yet another embodiment employing an APC-compatible connector interface.

FIG. 10 illustrates an expansion device 22 in accordance with yet another embodiment. Again, the embodiment of FIG. 10 is mostly similar to that of FIG. 4 and like features will not be repeatedly described. However, in this case, the second connector interface 32 is made APC-compatible only. If the DUTs are restricted to single-mode fibers only, the optical fiber 34 of the expansion device 22 may be selected with a smaller core diameter such as a 50 μm multimode fiber. Otherwise, the core diameter may be selected to be between about 60 and 90 μm.

It is noted that the insertion loss test set can be provided in the form of a light source and a power meter test instrument or in the form of two multifunction loss test instruments, for instance. It should be understood that the test instruments can be configured to further measure multiple characteristics of the DUT, including the bi-directional loss, the bi-directional optical return loss (ORL) and the length of the DUT. Such bi-directional measurements are allowed if each of the test instruments has an optical-fiber pigtailed light source and an optical-fiber pigtailed detector. These pigtailed components can be optically coupled to a connector interface of the test instrument so that the pigtailed light source can transmit light towards the connector interface and that light incoming from the connector interface can be detected using the pigtailed detector.

The embodiments described above are intended to be exemplary only. The scope of the invention is therefore intended to be limited solely by the appended claims.

The invention claimed is:

1. A power meter test arrangement for measuring the optical power loss of an optical-fiber device under test (DUT), the test arrangement comprising:
    a first test cord and a second test cord for connection to the DUT to form a test link comprising the first test cord, the DUT and the second test cord, which DUT is to be connected in series between the first test cord and the second test cord;
    a power meter instrument comprising:
        an input connector interface for connection towards one end of the test link for optical power measurement; and
        at least one fiber-pigtailed power detector connected to the input connector interface; and
    an optical-fiber expansion device comprising:
        a first connector interface for connection to the input connector interface of the power meter instrument, the first connector interface having a pinning arrangement that is complementary to a pinning arrangement of the input interface of the power meter instrument;
        a second connector interface for connection to the test link, the second connector interface having a pinning arrangement that is also complementary to the pinning arrangement of the input interface of the power meter instrument; and
        at least one optical fiber extending between the first connector interface and the second connector interface, wherein the optical fiber has core diameter that is between that of the DUT and that of the input interface of the power meter instrument and the optical fiber has numerical aperture that is between a numerical aperture of the optical-fiber of the DUT and a numerical aperture of the optical-fiber of the input interface of the power meter instrument;
    wherein connection of the expansion device to the power meter instrument converts the pinning arrangement of the input connector interface of the power meter instrument from pinned to unpinned or from unpinned to pinned, without adding extra measurement uncertainty in the optical power loss measurement.

2. The power meter test arrangement as claimed in claim 1, wherein the second connector interface comprises a hybrid connector interface configured for connection to either angle-polished (APC) or non-angle-polished (UPC) connectors.

3. The power meter test arrangement as claimed in claim 2,
    wherein the second connector interface comprises a hybrid ferrule and at least one optical fiber end embedded in the ferrule; and
    wherein the hybrid ferrule comprises a first and a second connection surface, the first connection surface being polished at angle relative to a longitudinal axis of the optical fiber and the second connection surface being polished substantially perpendicular to the longitudinal axis of the optical fiber, such that the first and the second connection surfaces together form a convex ferrule surface for connection to the DUT.

4. The power meter test arrangement as claimed in claim 3, wherein the second connector interface comprises a hybrid contactless connector interface configured for contactless connection to either angle-polished (APC) or non-angle-polished (UPC) connectors.

5. The power meter test arrangement as claimed in claim 4, wherein the hybrid ferrule further comprises a third surface polished at angle relative to a longitudinal axis of the optical fiber, such that the first, the second and the third surfaces together form a convex ferrule surface for connection to the DUT.

6. The power meter test arrangement as claimed in claim 1, wherein the first connector interface and the second connector interface each comprise a multifiber connector interface and wherein the at least one optical fiber comprises a plurality of optical fibers.

7. The power meter test arrangement as claimed in claim 6, wherein the at least one fiber-pigtailed power detector comprises a plurality of fiber-pigtailed power detectors respectively connected to said plurality of optical fibers.

8. The power meter test arrangement as claimed in claim 1, wherein said at least one optical fiber comprises a step-index multimode fiber.

9. The power meter test arrangement as claimed in claim 8, wherein a core diameter of said at least one optical fiber is between 60 and 90 μm.

10. The power meter test arrangement as claimed in claim 9, wherein a numerical aperture of said at least one optical fiber is between 0.2 and 0.22.

11. An insertion loss test set for measuring the optical power loss of an optical-fiber device under test (DUT), the insertion loss test set comprising:
  an optical source instrument comprising:
    an output connector interface for connection towards the other end of the test link for optical power measurement; and
    at least one fiber-pigtailed light source connected to the output connector interface;
  the power meter test arrangement as claimed in claim 1.

12. The power meter test arrangement as claimed in claim 1,
  wherein the power meter instrument further comprises a cartridge receiving cavity extending within a housing of the power meter instrument;
  wherein the optical-fiber expansion device further comprises a cartridge casing, sized and configured to fit in said cartridge receiving cavity, the cartridge casing having an inner end and an outer end, the outer end being provided with a connector adapter for connection toward the DUT;
  wherein said optical-fiber expansion device is housed within the cartridge casing between the inner end and the outer end;
  wherein said first connector interface of said optical-fiber expansion device extends at said inner end and is configured for interfacing with an optical port inside the power meter instrument;
  wherein said second connector interface of said optical-fiber expansion device is received at one side of the DUT connector adapter; and
  wherein the connector cartridge is removably connectable to the power meter instrument.

* * * * *